United States Patent [19]
Sakaguchi

[11] Patent Number: 5,473,619
[45] Date of Patent: Dec. 5, 1995

[54] METHOD AND APPARATUS FOR TESTING A DRIVING CIRCUIT

[75] Inventor: Hideaki Sakaguchi, Tenri, Japan

[73] Assignee: Sharp Kabushiki Kaisha, Osaka, Japan

[21] Appl. No.: 864,668

[22] Filed: Apr. 7, 1992

[30]     Foreign Application Priority Data

Apr. 8, 1991 [JP] Japan ................................ 3-075186

[51] Int. Cl.⁶ ................................................. G06F 11/00
[52] U.S. Cl. ........................ 371/25.1; 371/15.1; 371/24; 364/487
[58] Field of Search ............................. 371/25.1, 15.1, 371/24; 324/555, 770, 626, 612, 602, 605, 606, 608; 364/487

[56]            References Cited
          U.S. PATENT DOCUMENTS 4,734,687  3/1988  Jones .............................................. 371/24
4,893,311  1/1990  Hunter et al. ............................ 371/25.1
5,115,435  5/1992  Langford, II et al. .................. 371/25.1
5,172,047  12/1992 Funakura .................................. 371/25.1
5,228,042  7/1993  Gauthier et al. ............................ 371/24

Primary Examiner—Emanuel T. Voeltz
Assistant Examiner—Hal D. Wachsman

[57]                 ABSTRACT

An arbitrary input value is entered from an input circuit into a driving circuit, and the corresponding output value is detected by an output circuit, and the detected output value is stored in the memory circuit Other input value is fed into the driving circuit, and the detected value is similarly stored. In an arithmetic circuit, the relation between the two output values stored in the memory circuit and the arbitrary two input values fed in the driving circuit is determined, and approval or disapproval is judged by comparing with the criterion stored preliminarily in the control circuit.

11 Claims, 5 Drawing Sheets

METHOD AND APPARATUS FOR TESTING A DRIVING CIRCUIT

BACKGROUND OF THE INVENTION

1. Field of the Invention

The present invention relates to method and apparatus for testing of driving circuit for judging approval or disapproval of a driving circuit used in display control of, for example, liquid crystal display device.

2. Description of the Related Art

To realize a color display in a liquid crystal display device, by controlling the voltage applied to each pixel of the liquid crystal display device, an arbitrary luminance is obtained, while an arbitrary chrominance is obtained by combination of red light, blue light and green light.

The value of the voltage applied to each pixel is the voltage corresponding to the picture signal to be displayed being converted into the voltage used in each pixel display by the driving circuit.

By varying the input value of the voltage entering the driving circuit, the output value of the voltage produced from the driving circuit also changes. Thus, by controlling the voltage applied to the pixel, the luminance and chromainance of display are controlled.

To control the luminance and chrominance, a linear relation is required between the change of the input value of the voltage applied to the driving circuit and the change of the output value of the voltage produced from the driving circuit. In other words, uniform and arbitrary display is not achieved unless the driving circuits connected to the pixels for displaying in the liquid crystal display device possess equal input and output relations.

As shown in FIG. 3, a driving circuit 3 of a liquid crystal display device comprises a sampling hold circuit 8, a transfer circuit 9, an operational amplifier circuit 10, and an output circuit 11. These circuits 8, 9, 10, 11 comprise transistors, resistors, capacitors, switching circuits and other. Accordingly, if the transistor characteristic or the resistor or capacitor value is improper, a current may flow although the switching circuit is cut off, or a leakage current may flow in the wiring. In such a case, the driving circuits 3 connected to the pixels for displaying in the liquid crystal display device do not possess equal input and output relations, and uniform and arbitrary display is not achieved, and the display quality is lowered. It is therefore required to judge if the driving circuits 3 connected to the pixels possess equal input and output relations or not.

Hitherto, by feeding arbitrary two values c, d in the driving circuit as input value $\alpha 1$, and setting the allowable range for the output value $\beta 1$ to the input of values c, d, it is approved when the output value $\beta 1$ is in the allowable range for both c and d.

FIG. 1 is a graph for explaining the prior art, which shows the relation between the input value $\alpha 1$ and output value $\beta 1$. Supposing the input value $\alpha 1$ to be c, the coordinate is Cc if the output value $\beta 1$ is C1, the coordinate is Cb is C2, and the coordinate is Ca if C3. Hence, the allowable range of the output value $\beta 1$ for the input value c is from C1 to C3.

C1, C2 and C3 of output value $\beta 1$ are in a relation as represented by Formula 1, and the coordinates Ca, Cb, Cc commonly possess the approved output value $\beta 1$.

$$C1<C2<C3 \qquad \text{Formula 1}$$

Similarly, when the input value $\alpha 1$ is d, the coordinate is Da if the output value $\beta 1$ is D1, the coordinate is Db if D2, and the coordinate is Dc if D3. Hence, the allowable range of the output value $\beta 1$ for the input value d is from D1 to D3.

D1, D2 and D3 of output value $\beta 1$ are in a relation as represented by Formula 2, and the coordinates Da, Db, Dc commonly possess the approved output value $\beta 1$.

$$D3<D2<D1 \qquad \text{Formula 2}$$

Therefore, all driving circuits having the combination of the coordinates Ca, Cb, Cc and the coordinates Da, Db, Dc are approved.

Suppose there is a relation of Formula 3 between output values C3 and C1, D1 and D3, where E is a constant.

$$C3-C1=D1-D3=E \qquad \text{Formula 3}$$

The line R1 linking the coordinate Ca and coordinate Da and the line R2 linking the coordinate Dc and coordinate Dc are parallel to each other, and the output value $\beta 1$ with respect to the input value $\alpha 1$ always has a difference of constant E.

Between the line R3 linking the coordinate Ca and coordinate Dc and the line R4 linking the coordinate Dc and coordinate Da, the line R3 has the larger change of the output value $\beta 1$ accompanying the change of the input value $\alpha 1$, and the relation between the input value and output value is different.

Supposing the desired relation between the input value $\alpha 1$ and output value $\beta 1$ to be the line R5 linking the coordinate Cb and coordinate Db, in the prior art, the driving circuit possessing the relation of the lines R1, R2, R3, R4 not possessing the relation of the line R5 is also approved.

Therefore, the driving circuits possessing different input and output relations are judged to possess the same input and output circuits, and the display is not controlled uniformly, and hence the display quality is lowered.

The invention hence presents a method for testing of driving circuit for judging approval or disapproval of driving circuit by making use of the relation between a first signal fed in the driving circuit and a second signal produced from the driving circuit corresponding to the first signal, comprising:

a step of feeding a predetermined first signal in the driving circuit, a step of storing a second signal produced from the driving circuit corresponding to the first signal, a step of calculating the numerical value corresponding to the relation in plural sets of the first signal and second signal, and a step of judging approval or disapproval of the driving circuit by comparing the criterion corresponding to the relation between the predetermined first signal and second signal with the numerical value obtained by operation in the calculating step.

The invention also presents a method for testing of a driving circuit, in which the driving circuit receives mutually different plural first signals.

The invention also presents a method for testing of a driving circuit, in which the change rate of the second signal and the second signal corresponding to the predetermined first signal are calculated from the plural first signals and the plural second signals obtained corresponding to the plural first signals.

The invention also presents a method for testing of a driving circuit, in which the change rate of the second signal obtained by calculation above and the second signal corresponding to the predetermined first signal are compared respectively with the standard change rate predetermined in relation to the second signal and the standard second signal corresponding to the predetermine first signal, and the driving circuit being tested is judged to be approved when coinciding in both cases.

Furthermore, the invention presents an apparatus for testing of a driving circuit for judging approval or disapproval of driving circuit by making use of the relation between a first signal fed in the driving circuit and a second signal produced from the driving circuit corresponding to the first signal, comprising:

input means for feeding a predetermined first signal in the driving circuit, memory means for storing a second signal produced from the driving circuit corresponding to the first signal, arithmetic means for calculating the numerical value corresponding to the relation of plural sets of first signal and second signal, and judging means for judging approval or disapproval of driving circuit by comparing the criterion corresponding to the relation between the predetermined first signal and second signal with the numerical value obtained by the arithmetic means.

SUMMARY OF THE INVENTION

It is hence a primary object of the invention to present method and apparatus for testing of a driving circuit for judging approval or disapproval of driving circuit at high precision.

According to the invention, in the method for testing of a driving circuit for approval or disapproval of driving circuit by making use of the relation between a first signal fed in the driving circuit and a second signal produced from the driving circuit corresponding to the first signal, first a predetermined first signal is fed in the driving circuit, and the second signal produced from the driving signal corresponding to the first signal is stored. The numerical value corresponding to the relation of plural sets of the input plural first signals and second signals is calculated, and the calculated numerical value and a criterion corresponding to the relation between the predetermined first signal and second signal are compared, and the approval or disapproval of the driving circuit is judged. By calculating the numerical value corresponding to the relation of plural sets of input signal and output signal, and comparing with the criterion, the precision of judgement of approval or disapproval is enhanced.

According to the invention, furthermore, mutually different plural first signals are fed in the driving circuit, and the numerical value corresponding to the relation of plural sets of the mutually different first signals and the second signals corresponding to the first signals is compared with the criterion.

In the invention, the numerical values calculated corresponding to the relation of plural sets of the plural first signals and plural second signals obtained corresponding to the plural first signals are the change rate of the second signals and the second signal corresponding to the predetermined first signal.

In the invention, judgement of approval or disapproval of the driving circuit to be tested is effected by comparing the change rate of the second signal obtained by calculation, and the second signal corresponding to the predetermined first signal respectively with the standard change rate predetermined in relation to the second signal, and the standard second signal corresponding to the predetermined first signal. It is judged to be approved when both the change rate of the second signal and the second signal corresponding to the predetermined first signal coincide with the standard values.

Also according to the invention, in the apparatus for testing of driving circuit for judging approval or disapproval of driving circuit by making use of the relation between a first signal fed in the driving signal and a second signal produced from the driving circuit corresponding to the first signal, input means feeds a predetermined first signal into the driving circuit, and memory means stores the second signal produced from the driving circuit corresponding to the first signal. Arithmetic means calculates the numerical value corresponding to the relation of plural sets of first signal and second signal, and judging means judges approval or disapproval of the driving circuit by comparing the criterion corresponding to the relation between the predetermined first signal and second signal with the numerical value calculated by the arithmetic means. By calculating the numerical value corresponding to the relation of plural sets of first signal and second signal, and comparing with the criterion, the precision of judgement of approval or disapproval is enhanced.

Thus, according to the invention, the judging means compares the numerical value expressing the relation between the input value and output value with the predetermined criterion, and judges approval or disapproval of the driving circuit depending on the result of the comparison. Therefore, approval or disapproval of the driving circuit may be judged accurately.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
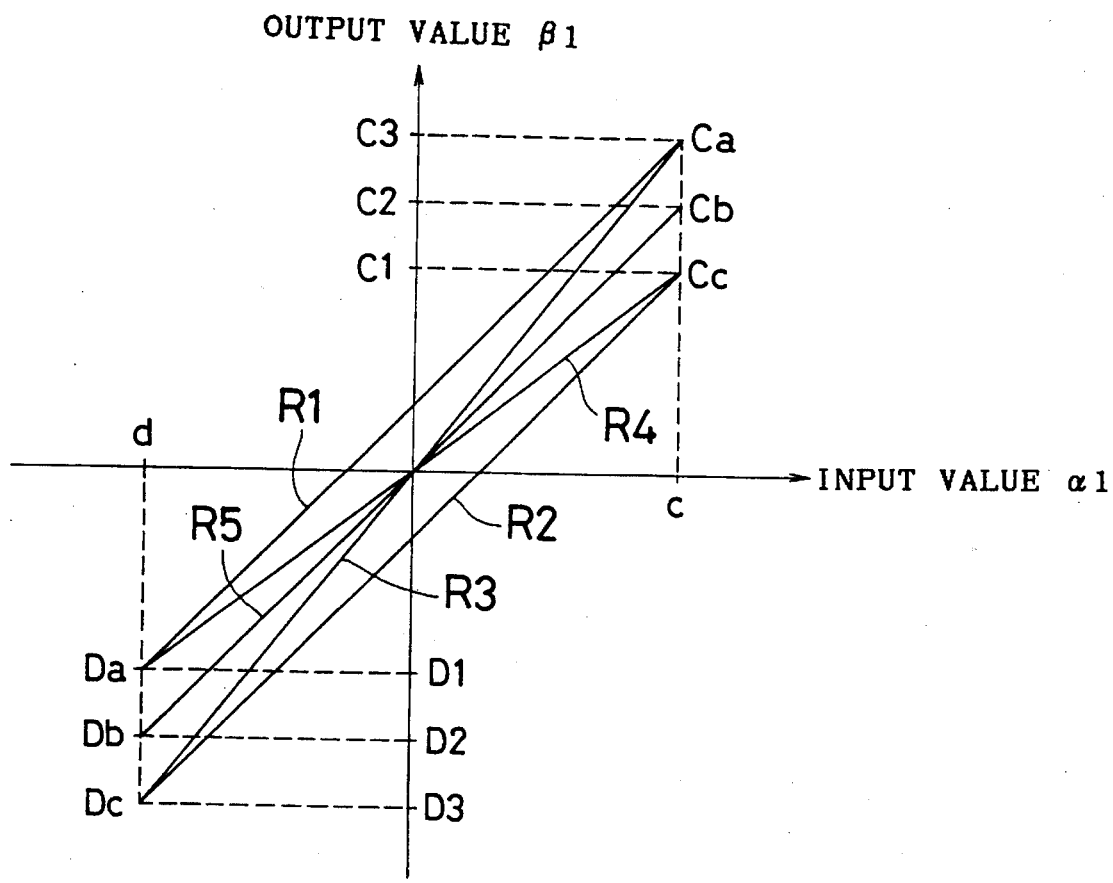
FIG. 1 is a graph illustrating prior art.

Now referring to the drawing, preferred embodiments of the invention are described below.

Figure 2:
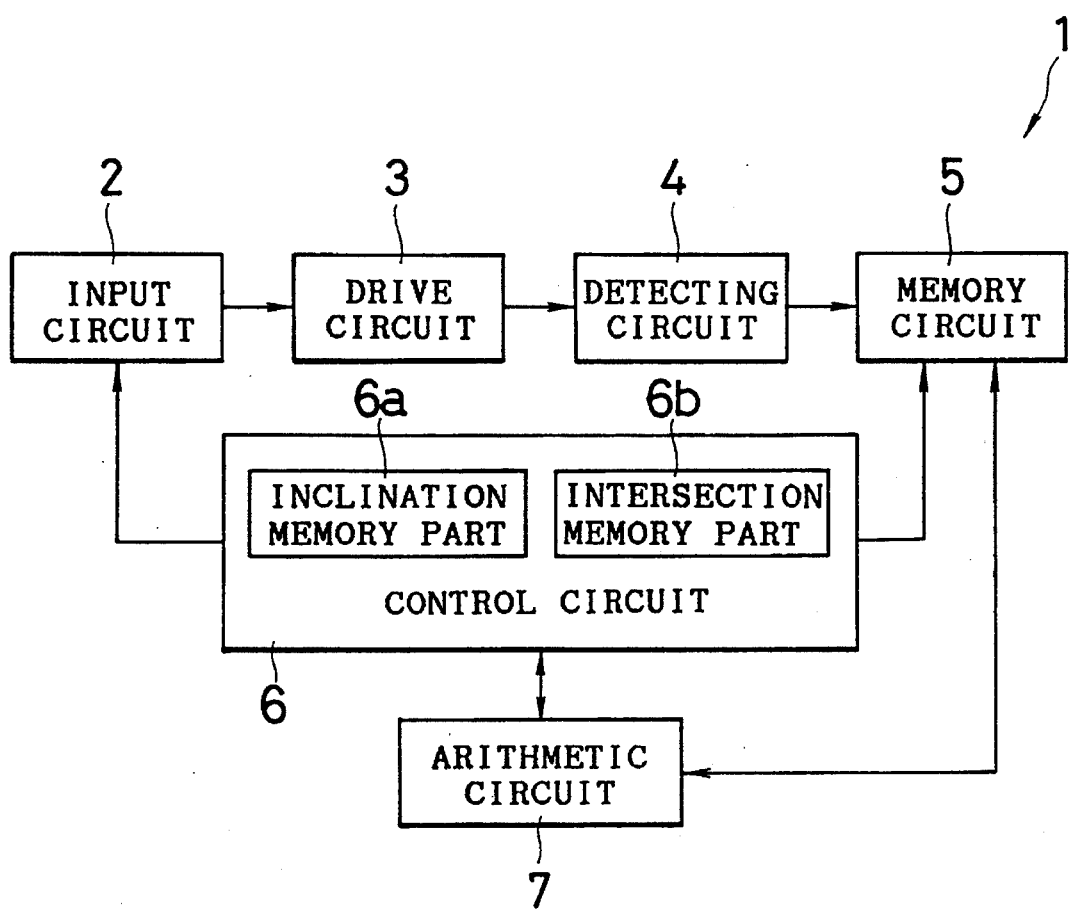
FIG. 2 is a block diagram showing a testing device 1 as an embodiment of the invention.
Figure 3:
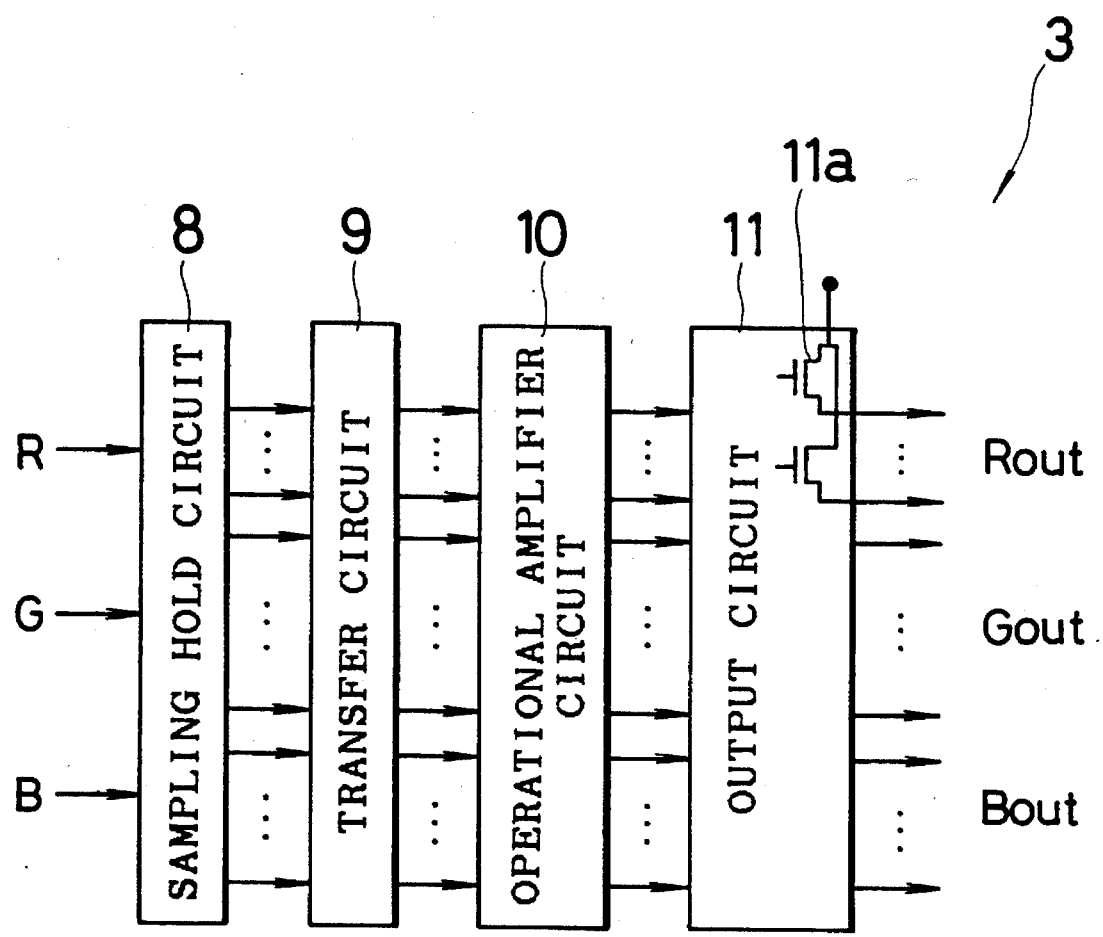
FIG. 3 is a block diagram showing a driving circuit 3 shown in FIG. 2.

FIG. 2 is a block diagram showing a test device 1 in an embodiment of the invention, and FIG. 3 is a block diagram showing a driving circuit shown in FIG. 2. The test device 1 comprises an input circuit 2 which is input means, a driving circuit 3, a detecting circuit 4 which is detecting means, a memory circuit 5 which is storing means, a control circuit 6 which is judging means, and an arithmetic circuit 7 which is arithmetic means.

The driving circuit 3 to be tested is connected to the input circuit 2 and detecting circuit 4, and the detecting circuit 4 is connected to the memory circuit 5. The control circuit 6 is connected to the input circuit 2, the memory circuit 5 and the arithmetic circuit 7, and the memory circuit 5 and the arithmetic circuit 7 are connected with each other.

When the driving circuit 3 controls the display of the liquid crystal display device, as shown in FIG. 3, the driving circuit 3 comprises sampling hold circuit 8, a transfer circuit 9, an operational amplifier circuit 10, and an output circuit 11.

For color display, the signals of red, green and blue corresponding to the display are synthesized, and the signal is separated in a color separation circuit or the like before entering the driving circuit 3, and red signal. R, green signal G and blue signal B are individually fed into the sampling hold circuit 8. In the sampling hold circuit 8, signals corresponding to plural pixels for displaying each color of the liquid crystal display device are continuously supplied as color signals R, G, B, and therefore the sampling hold circuit 8 is composed of a capacitor for accumulating the levels of the signals corresponding to the plural display pixels, and a switching circuit for changing over input/cutoff of the signal to the capacitor or output/cutoff of the signal level accumulated in the capacitor, among others, and the signal corresponding to each display pixel is sampled in every predetermined period, and held and produced.

The output of the sampling hold circuit 8 is fed into the transfer circuit 9. The transfer circuit 9 is a switching circuit realized by transistor or the like, and the output of the transfer circuit 9 is fed into the operational amplifier circuit 10. The operational amplifier circuit comprises resistors and capacitors connected to the operational amplifier. The signal amplified and stabilized in the operational amplifier circuit is delivered to the output circuit 11.

The output circuit 11 comprises field effect transistors (FET) 11a corresponding the number of display pixels, and the resistance value between the source and drain is adjusted depending on the input value to the gate. The output circuit 11 delivers output values Rout, Gout, Bout for driving the pixels to the pixels depending on the input signal from the operational amplifier circuit 10.

In the circuits 8, 9, 10, 11, a deviation from the design value may occur. In this case, the characteristic as the driving circuit 3 may be deviated.

The control circuit 6 comprises an inclination memory part 6a and an intersection memory part 6b. An inclination z is preliminarily stored in the inclination memory part 6a, and an intersection y is stored preliminarily in the intersection memory part 6b.

Figure 4:
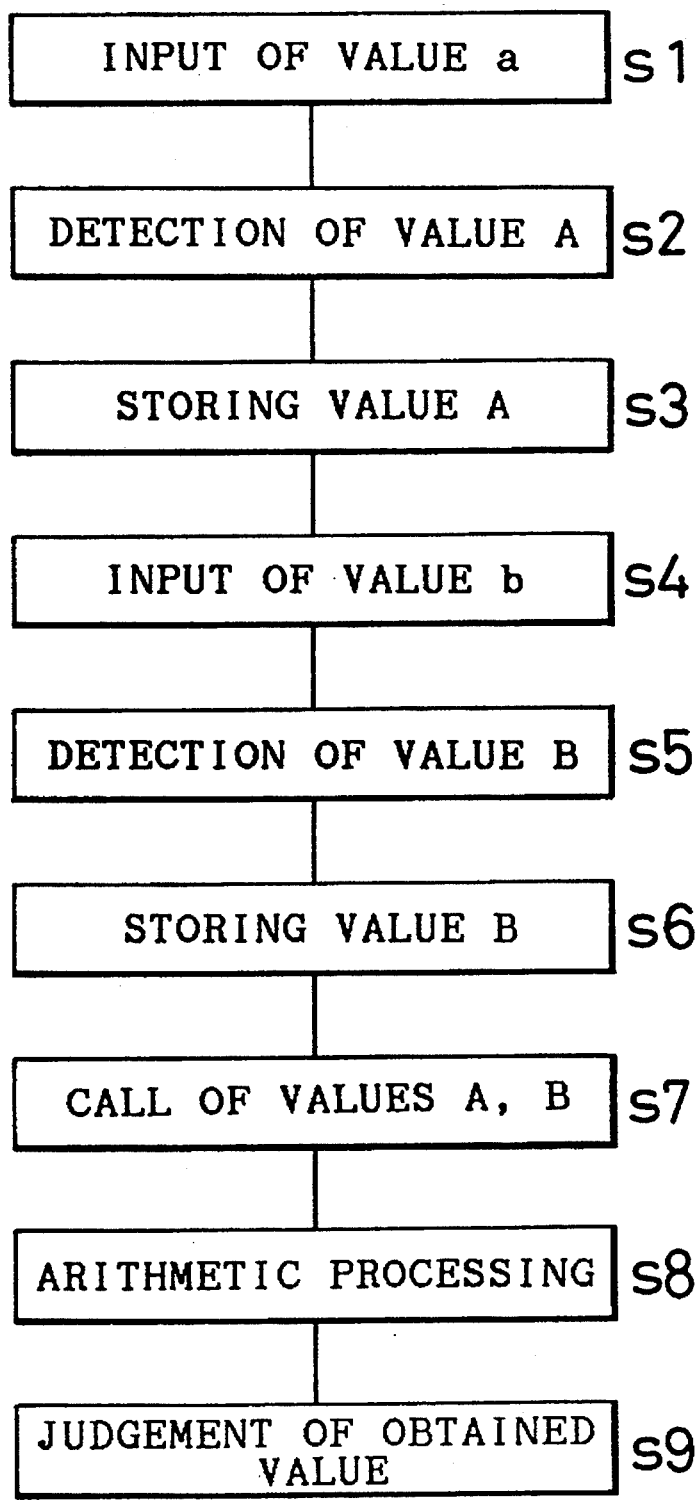
FIG. 4 is a process diagram showing the test process of test device shown in FIG. 2.
Figure 5:
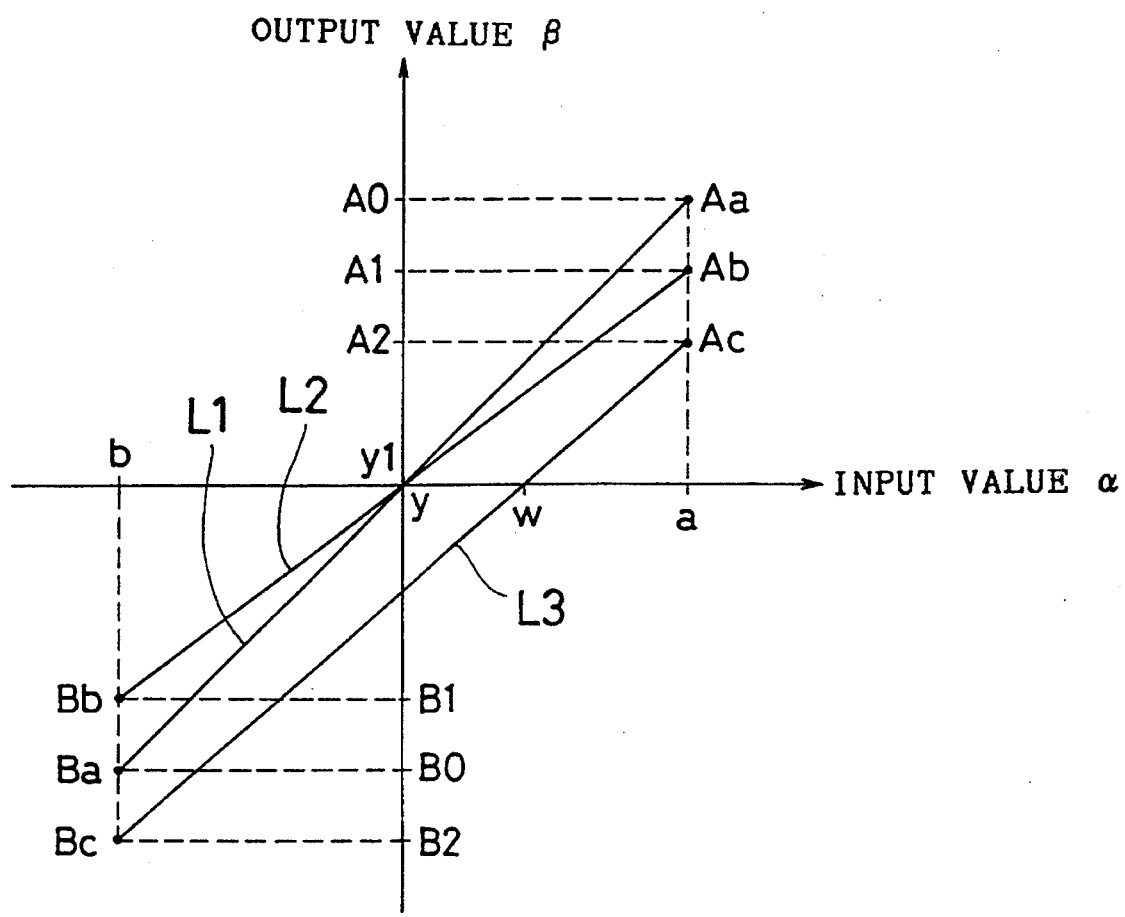
FIG. 5 is a graph showing the criterion of the test device in FIG. 2.

FIG. 4 is a process diagram for explaining the test process of the test device 1 shown in FIG. 2, and FIG. 5 is a graph showing the criterion of the test device 1 shown in FIG. 2, showing an example of relation between input value $\alpha$ and output value $\beta$. In the test, two values a, b are entered as the input value $\alpha$, and the driving circuit 3 having the relation of the line L1 linking the coordinate Aa in which the output value $\beta$ is AO w=en the input value $\alpha$ is a and the coordinate Ba in which the output value $\beta$ is BO w=en the input value $\alpha$ is b is judged to the approved.

The inclination z of the line L1 is expressed in Formula 4.

$$z = \frac{a-b}{AO-BO} \quad \text{Formula 4}$$

By using this inclination z, the intersection y of the. input valve $\alpha$ axis and the line L1 is determined. The linear equation of the line L1 is expressed in Formula 5.

$$\alpha = z\beta + y \quad \text{Formula 5}$$

The inclination z of the line L1 is preliminarily stored in the inclination memory area 6a of the control circuit 6, and the intersection y of the line L1 in the intersection memory area 6b as the values of criterion.

At step s1, a is entered as the input value $\alpha$ from the input circuit 2 into the driving circuit 3 depending on the control of the control circuit 6. At step s2, the output value $\beta$, for example A, produced from the driving circuit 3 is detected by the detecting circuit 4, and this detected output value A is stored in the memory circuit 4 at step s3.

At step s4, b is entered as the input value $\alpha$ from the input circuit 2 into the driving circuit 2 depending on the control of the control circuit 6. At step s5, the output value $\beta$, for example B, produced from the driving circuit 3 is detected by the detecting circuit 4, and this detected output value B is stored in the memory circuit 5 at step s6.

At step s7, the output values A, B are delivered from the memory circuit 5 into the arithmetic circuit 7 by the control circuit 6, and at step s8 the arithmetic circuit 7 determines the linear equation by using the input values a, b and output values A, B, and the inclination and intersection of the linear equation are determined. At step s9, the inclination and intersection obtained at step s8 are compared with the inclination z and intersection y stored in the control circuit 6, and it is judged to be approved when coinciding, and disapproved when disagreeing.

Therefore, the line L2 linking the coordinate Ab in which the output value $\beta$ to the input value a is A1 and the coordinate Bb in which the output value $\beta$ to the input value b is B1 is disapproved because the inclination is different although the intersection y coincides with the line L1.

Similarly, the line L3 linking the coordinate Ac in which the output value $\beta$ to the input value a is A2 and the coordinate Bc in which the output value $\beta$ to the input value b is B2 is disapproved because the inclination z does not agree with the line Li and the intersection is w which is different from the intersection y.

Thus, according to this embodiment, only the driving circuit 3 showing the relation of the input value $\alpha$ and output value $\beta$ coinciding with the line L1 is approved, so that the display quality may be enhanced.

In the foregoing embodiment, the inclination z and intersection y shown in Formula 5 were set as standard values, but also the inclination z1 shown in Formula 6 and the intersection y1 of the output value $\beta$ axis may be used as standard values.

$$z1 = \frac{AO-BO}{a-b} \quad \text{Formula 6}$$

In this embodiment, the driving circuit 3 is explained as the driving circuit used in liquid crystal display device, but this driving circuit 3 is not limited to the driving circuit for driving the liquid crystal display device only.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of testing a driving circuit for judging approval or disapproval of the driving circuit by making use of a relation between a first signal fed into the driving circuit and a second signal produced from the driving circuit corresponding to the first signal, comprising the steps of:

a) feeding a predetermined first signal into the driving circuit, (b) storing a second signal produced from the driving circuit corresponding to the predetermined first signal, (c) calculating a numerical value corresponding to a relation of inclination, x and y intercepts in plural sets of the first signal and second signal, and (d) judging approval or disapproval of the driving circuit by comparing a criterion corresponding to a relation of inclination and the x and y intercepts between the predetermined first signal and second signal with the numerical value obtained in step (c).

2. A method of testing the driving circuit of claim 1, wherein step (c) includes determining x and y intercepts.

3. The method of claim 1, further including the step of determining the inclination and x and y intercepts of plural sets of the first predetermined signal and the second signal after step (b) and before step (c).

4. A method of testing a driving circuit for judging approval or disapproval of the driving circuit by making use of a relation between a first signal fed into the driving circuit and a second signal produced from the driving circuit corresponding to the first signal, comprising the steps of:

(a) feeding a plurality of distinct predetermined first signals into the driving circuit, (b) storing a plurality of second signals produced from the driving circuit corresponding to the plurality of distinct predetermined first signals, (c) calculating numerical values related to the inclination corresponding to a relation in plural sets of each distinct predetermined first signal and each second signal, (d) judging approval or disapproval of the driving circuit by comparing a criterion corresponding to the relation between the distinct predetermined first signals and second signal with the numerical value obtained in step (c).

5. A method for testing a driving circuit of claim 4, additionally determining y intercepts in step (c) and the driving circuit being tested is judged for approval or disapproval based on the inclination and the y intercepts.

6. An apparatus for testing a driving circuit for judging approval or disapproval of the driving circuit by making use of a relation between a first signal fed in the driving circuit and a second signal produced from the driving circuit corresponding to the first signal, comprising:

input means for feeding a predetermined first signal into the driving circuit, memory means for storing a second signal produced from the driving circuit corresponding to the first signal, arithmetic means for calculating the numerical value corresponding to an inclination, x and y intercepts of plural sets of first signal and second signal, and judging means for judging approval or disapproval of driving circuit by comparing a criterion corresponding to inclination and x and y intercepts between the predetermined first signal and second signal with the numerical value obtained by the arithmetic means.

7. The apparatus for testing a driving circuit as claimed in claim 6, wherein the driving circuit further includes means for controlling a display of a liquid crystal display.

8. The apparatus for testing a driving circuit, as claimed in claim 6, wherein the input means is operatively connected to the driving circuit and said driving circuit includes a sampling and hold circuit, a transfer circuit an operational amplifier circuit and an output circuit.

9. The apparatus for testing a driving circuit, as claimed in claim 8, wherein the circuits of the testing circuit includes transistors resistors and capacitors.

10. A method of testing a driving circuit for judging approval or disapproval of the driving circuit by making use of a relation between a first signal fed in to the driving circuit and a second signal produced from the driving circuit corresponding to the first signal, comprising the steps of:

(a) feeding a predetermined first signal into the driving circuit, (b) storing a second signal produced from the driving circuit corresponding to the first signal, (c) determining the inclination and x and y intercepts of plural sets of the first predetermined signal and the second signal, (d) calculating a numerical value corresponding to a relation based on a rate of change of inclination, x and y intercepts in plural sets of the first predetermined signal and second signal, and (e) judging approval or disapproval of the driving circuit by comparing a criterion corresponding to a relation of inclination and the x and y intercepts between the predetermined first signal and second signal with the numerical value obtained in step (c) so that uniform display characteristics can be achieved in a liquid crystal display device.

11. The method of claim 10, wherein the driving circuit is operatively connected to pixels of the liquid crystal display device.

* * * * *